(12) United States Patent
Clementi

(10) Patent No.: US 8,985,333 B1
(45) Date of Patent: Mar. 24, 2015

(54) ADJUSTABLE TABLET HOLDER

(71) Applicant: Rosanne G. Clementi, Tampa, FL (US)

(72) Inventor: Rosanne G. Clementi, Tampa, FL (US)

(*) Notice: Subject to any disclaimer, the term of this patent is extended or adjusted under 35 U.S.C. 154(b) by 0 days.

(21) Appl. No.: 14/444,487

(22) Filed: Jul. 28, 2014

(51) Int. Cl.
| | | |
|---|---|---|
| A45C 11/00 | (2006.01) | |
| B60R 11/02 | (2006.01) | |
| F16M 13/00 | (2006.01) | |
| F16M 11/00 | (2006.01) | |

(52) U.S. Cl.
CPC ........... *A45C 11/00* (2013.01); *A45C 2011/003* (2013.01); *F16M 13/00* (2013.01); *F16M 11/00* (2013.01); *B60R 11/0241* (2013.01); *B60R 11/0252* (2013.01)
USPC ...................................................... 206/476

(58) Field of Classification Search
CPC ................. F16M 11/04–11/041; F16M 11/14; F16M 13/00; F16M 13/02; B60R 11/0241; B60R 11/0252; A45C 11/00; A45C 2011/003
USPC ......... 206/476; 248/200, 309.1, 316.1, 316.4, 248/316.6–316.8, 346.01, 346.03–346.07; 361/679.25, 679.29–679.3, 361/679.55–679.56, 679.57, 807, 809, 825; 455/90.3, 575.1, 575.3–575.4, 575.8
IPC ....................................................... A45C 11/00
See application file for complete search history.

(56) References Cited

U.S. PATENT DOCUMENTS

| | | | | |
|---|---|---|---|---|
| 1,684,925 | A * | 9/1928 | Perlmutter | 248/346.07 |
| 4,118,002 | A * | 10/1978 | Bartlett | 248/311.2 |
| 5,788,202 | A * | 8/1998 | Richter | 248/316.4 |
| 8,112,924 | B2 * | 2/2012 | Longobardo | 248/298.1 |
| 8,424,825 | B2 * | 4/2013 | Somuah | 248/316.4 |
| 2005/0205728 | A1 * | 9/2005 | Avery | 248/149 |
| 2006/0278788 | A1 * | 12/2006 | Fan | 248/309.1 |
| 2006/0285306 | A1 * | 12/2006 | Carnevali | 361/758 |
| 2007/0262223 | A1 * | 11/2007 | Wang et al. | 248/346.07 |
| 2007/0284500 | A1 * | 12/2007 | Fan | 248/346.06 |
| 2012/0025035 | A1 * | 2/2012 | Huang | 248/122.1 |
| 2012/0175474 | A1 * | 7/2012 | Barnard et al. | 248/122.1 |
| 2013/0075544 | A1 * | 3/2013 | Liu | 248/122.1 |
| 2013/0148273 | A1 * | 6/2013 | Tsai | 361/679.01 |
| 2013/0277520 | A1 * | 10/2013 | Funk et al. | 248/274.1 |

* cited by examiner

*Primary Examiner* — Bryon Gehman
*Assistant Examiner* — Brijesh V. Patel
(74) *Attorney, Agent, or Firm* — Ronald E. Smith; Smith & Hopen, P.A.

(57) ABSTRACT

A tablet holder includes a generally square base having a protuberance formed in each side of the base, each protuberance extending radially outwardly with respect to a center of the base. Each protuberance is recessed relative to the base, creating a channel having a bottom wall and upstanding sidewalls. A detent plate is mounted in each channel and has a range of travel relative to the bottom wall. A raising and lowering assembly raises and lowers the detent plate. Guide rails are formed in each channel and a holder is slideably mounted to the guide rails. Each holder has a slotted bottom plate, guide rail housings for slideably receiving the guide rails, on opposite sides of the slot, and an upstanding end wall adapted to abuttingly engage a tablet. Each holder is slideably adjustable or locked against sliding when the detent plate is elevated or lowered, respectively.

18 Claims, 17 Drawing Sheets

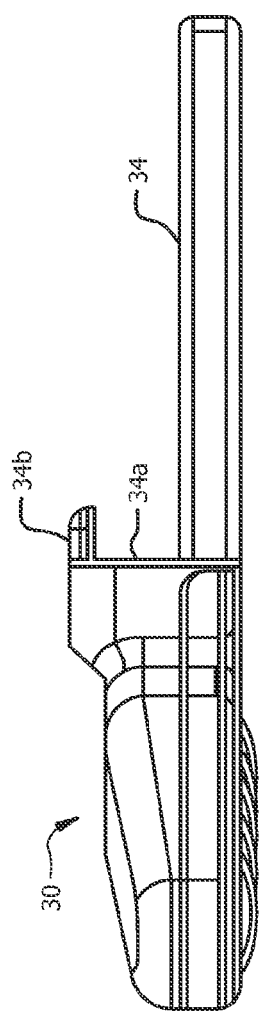
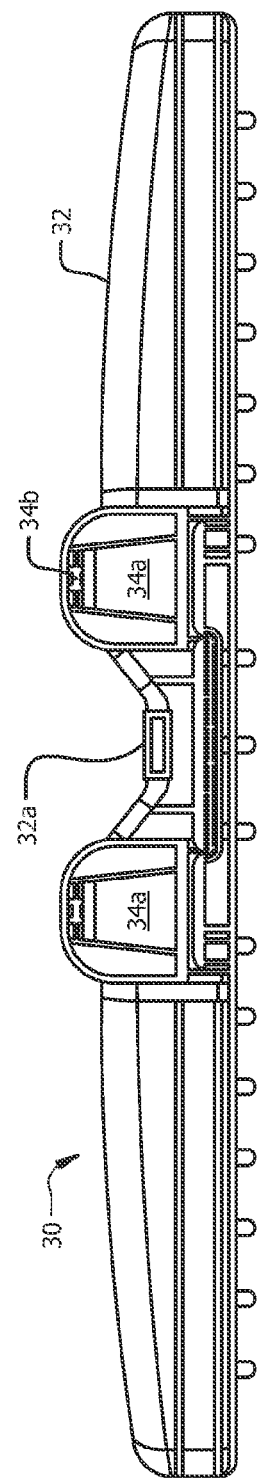

ADJUSTABLE TABLET HOLDER

BACKGROUND OF THE INVENTION

1. Field of the Invention

This invention relates, generally, to tablet holders. More particularly, it relates to a tablet holder having tool-free adjustment means that enables the secure holding of tablets of varying sizes in both landscape and portrait orientations.

2. Description of the Prior Art

The known stands that could be adapted to hold a tablet are one-size-fits all stands, i.e., they are not adjustable and therefore cannot grip tablets of differing sizes.

Some tablet protective covers are foldable to support the tablet at various angles. The number of angles is limited.

Tripods, both full size and tabletop-size, are equipped with a screw that enables a camera or a camcorder to be mounted thereon. Tripod mounting is advantageous because the device mounted thereto can be held in an infinite number of orientations. However, there are no known tablet holders that can be mounted on a tripod.

Thus there is a need for an adjustable tablet holder that holds tablets of widely differing sizes at any desired angle and which frees both hands of the user.

There is also a need for a light-in-weight, mechanically robust tablet holder that can be adjusted without tools to hold tablets of differing sizes.

There is also a need for a tablet than can be mounted on a tripod.

However, in view of the art considered as a whole at the time the present invention was made, it was not obvious to those of ordinary skill in the art how the needed tablet holder could be provided.

SUMMARY OF THE INVENTION

The long-standing but heretofore unfulfilled need for an improved tablet holder is now met by a new, useful, and non-obvious invention.

The novel tablet holder includes a central base having a generally square configuration with four sides. Four channels are formed in the central base, with each channel being in open communication with a different one of the four sides. Each channel has an axis of symmetry normal to an axis of symmetry of its contiguous channels, and each axis of symmetry radiates outwardly from a center of the central base, bisecting it associated side.

A holder is slideably mounted within each of the channels, there being one holder slideably mounted within each channel. Each holder has a radially innermost position and a radially outermost position.

Each holder has an upstanding end wall formed in a radially outermost end of said holder. The end wall is adapted to abuttingly engage a side wall of a tablet that overlies and is supported by the central base when each holder is slid in its associated channel toward the center of the central base.

More particularly, the novel tablet holder includes a central base in the form of a thin, flat, generally square plate having a top surface and an underside. The generally square plate has a protuberance formed in each side of the base, centered mid-length thereof. Each protuberance extends radially outwardly relative to a center of the central base and projects radially outwardly of each side of the central base.

Each protuberance is recessed relative to the top surface of the central base, thereby creating a channel in each protuberance. Each channel has a flat bottom wall and upstanding sidewalls. A thin, flat detent plate is mounted in each channel, midway between the sidewalls and has a range of travel extending from a first position where it overlies and abuts the channel bottom wall to a second position where it is parallel to the bottom wall and elevated with respect thereto. A raising and lowering means that includes a nut and a screw is provided for raising and lowering the detent plate with respect to the channel bottom wall.

An anti-rotation means is also provided for preventing rotation of the detent plate. The anti-rotation means includes a notch formed in the detent plate and a raised ridge formed integrally with the channel bottom wall. The raised ridge engages the notch so that the detent plate and the detent plate screw formed integrally therewith cannot rotate about an axis of rotation of the screw. The screw is also held against rotation so that rotation of the nut effects raising and lowering of the screw and hence the detent plate.

A pair of guide rails is formed integrally with the channel bottom wall. Each guide rail has a flat top surface and is raised with respect to the channel bottom wall. Each guide rail is spaced apart from the detent plate, and from the channel sidewalls.

A holder is slideably mounted to each of the protuberances, there being one holder slideably mounted within each channel. Each holder includes a bottom plate having a slot formed therein. Each slot extends radially outwardly relative to a center of the base. Each holder further includes a pair of parallel guide rail housings which are raised with respect to the bottom plate on opposite sides of the slot and which slideably receive the guide rails formed in an associated protuberance. Each guide rail housing has a flat top surface that overlies the flat top surface of its associated guide rail when each holder slidingly engages its associated protuberance. Each holder further includes at least one upstanding end wall adapted to abuttingly engage a side of a tablet, each end wall being normal to the holder bottom plate.

The detent plate is raised above an imaginary plane defined by the flat top surfaces of the guide rail housings to enable sliding of the slotted bottom plate under the detent plate and over the respective flat top surfaces of the guide rail housings so that the slotted bottom plate of the holder is sandwiched between the flat top surfaces of the guide rail housings and the bottom surface or underside of the detent plate. Each holder is slid in its associated channel toward the center of the base and its upstanding end wall is adapted to abuttingly engage a sidewall of a tablet that overlies and is supported by said base.

A locking means is adapted to secure each holder against sliding movement when all four holders are adapted to abuttingly engage each side of the tablet. Each holder is locked against sliding by clamping the slotted bottom plate to the flat top surfaces of said guide rail housings. The clamping is accomplished by lowering the detent plate with respect to the slotted bottom plate to thereby sandwich the slotted bottom plate of the holder between the detent plate and the flat top surfaces of the guide rail housings.

The raising and lowering means for raising and lowering the detent plate includes an externally threaded screw that is integrally formed with and which depends from the detent plate in perpendicular relation thereto. The raising and lowering means further includes means for preventing rotation of the detent plate and hence of the screw. A nut rotatably engages the screw and means are provided for causing rotation of the nut in a first direction or a second direction opposite to the first direction while holding the nut against linear travel so that the screw and hence the detent plate are constrained to displace away from the channel bottom wall or to displace toward the channel bottom wall, depending upon the direction of rotation of the nut.

The raising and lowering means further includes a washer that underlies and abuts the underside of the channel bottom wall. The washer has a central opening in axial alignment with the screw and the nut which underlies the washer and engages the screw.

A rotatably mounted knob bottom part has a non-round recess that captures the nut and causes the nut to rotate conjointly with the knob bottom part.

A retainer ring has a round recess formed therein for accommodating the knob bottom part and is non-rotatably secured to the underside of the channel bottom wall, thereby retaining the knob bottom part in engaged relation to the nut.

A knob top part is disposed in underlying relation to the retainer ring and is connected to the knob bottom part so that rotation of the knob top part causes conjoint rotation of the knob bottom part and hence of the nut that rotates conjointly with the knob bottom part, thereby causing up or down travel of the screw and the detent plate, depending upon the direction of rotation of said knob top part, said screw and detent plate being unable to rotate due to said raised ridge.

A diametrically disposed upstanding wall is formed in the knob top part to enable a user to manually rotate the knob top part.

A handle may be formed integrally with each of the slideably mounted holders to facilitate manual sliding of the holders. A channel is formed in each handle to accommodate a power cord and a dished region is formed in each handle on opposite sides of the channel to facilitate grasping of the handle.

A plurality of legs is secured to an underside of the base. The legs have a common extent that exceeds the combined vertical extent of the detent raising and lowering assembly so that the detent raising and lowering assembly is spaced above a table top when the tablet holder is supported by a tabletop.

The raising and lowering means for raising and lowering the detent plate may also be provided in a simpler structure having no knob bottom part, retainer ring, or knob top part. The simpler structure includes a washer that underlies and abuts the underside of the channel bottom wall. The washer has a central opening in axial alignment with the detent plate screw.

A thumb nut underlies the washer and engages the detent plate screw. The thumb nut has a knurled surface and a diameter sufficiently large to enable a user to manually rotate it in either direction as required to raise or lower said detent plate. Advancing the thumb nut causes the screw and detent plate to displace downwardly into clamping relation to the slotted bottom plate of the holder plates and retracting the thumb nut lifts the screw and detent plate to enable adjusting the position of the holder.

An overhang may be formed in each upstanding tablet-engaging end wall of each holder to capture a tablet if said tablet holder is inverted.

At least one opening may be formed in the base to enable attachment of a lanyard line to the base.

Moreover, at least one material-saving opening may be formed in the base as well.

At least one foam pad may be positioned atop each of the holders. Each foam pad biases a thin tablet against the overhang formed in each holder.

An internally threaded sleeve or insert may be positioned in the center of the base on the underside thereof. The sleeve or insert is adapted to engage a tripod mounting screw so that the tablet holder may be supported by a tripod.

The primary object of this invention is to provide a light-in-weight, mechanically robust, size-adjustable tablet holder that can hold a wide range of tablets.

Another important object is to provide a tablet holder that can be quickly adjusted, without the use of tools, to hold tablets of varying sizes.

Still another object is to provide a tablet holder that is equipped with aesthetically pleasing ergonomic clamps.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the nature and objects of the invention, reference should be made to the following detailed disclosure, taken in connection with the accompanying drawings, in which:

FIG. 3D is a side elevation view of the novel handle;

FIG. 3E is a front elevation view of the novel handle;

DETAILED DESCRIPTION OF THE PREFERRED EMBODIMENT

Figure 1A:
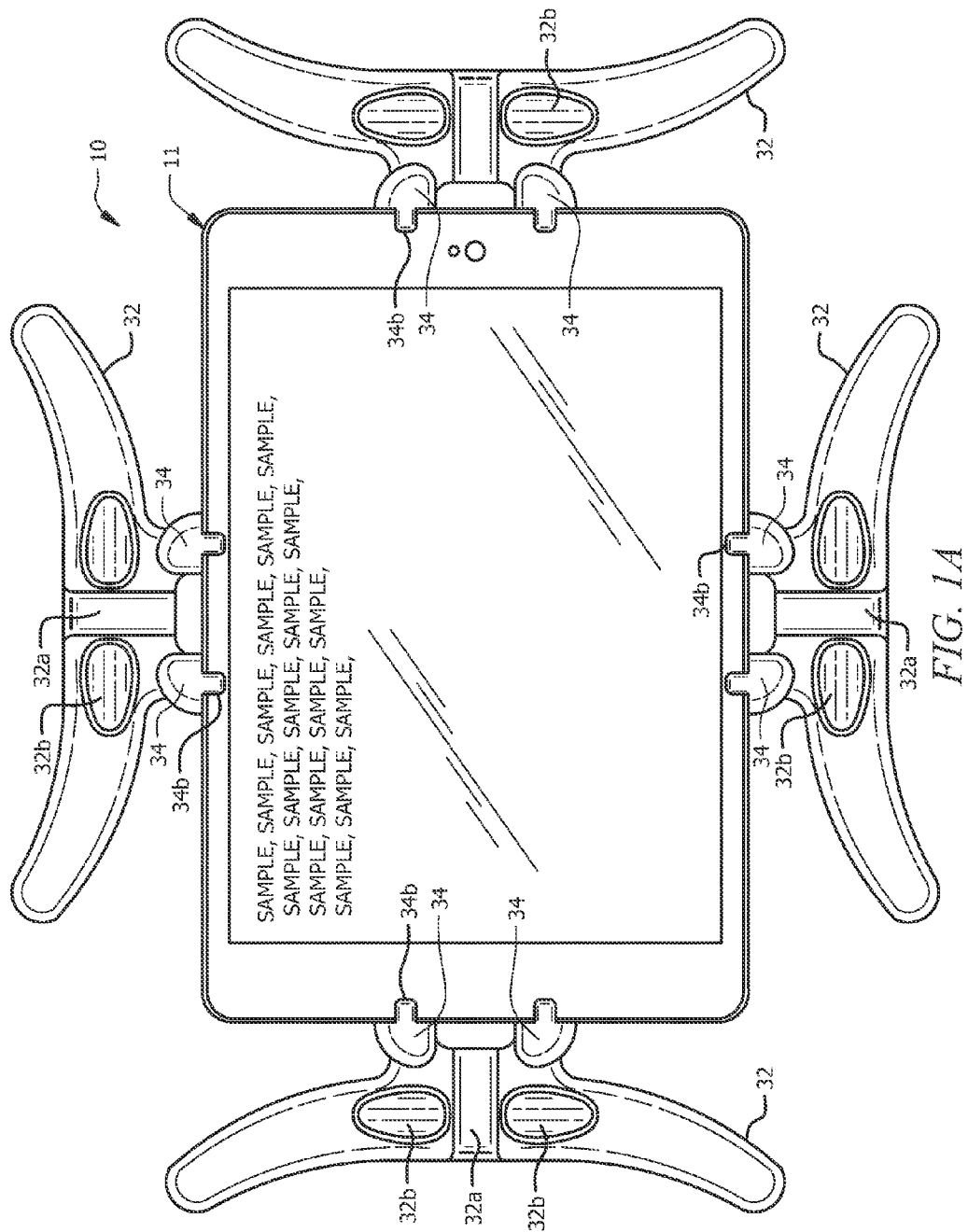
FIG. 1A is a top perspective view of the novel tablet holder holding a tablet in landscape orientation.
Figure 1B:
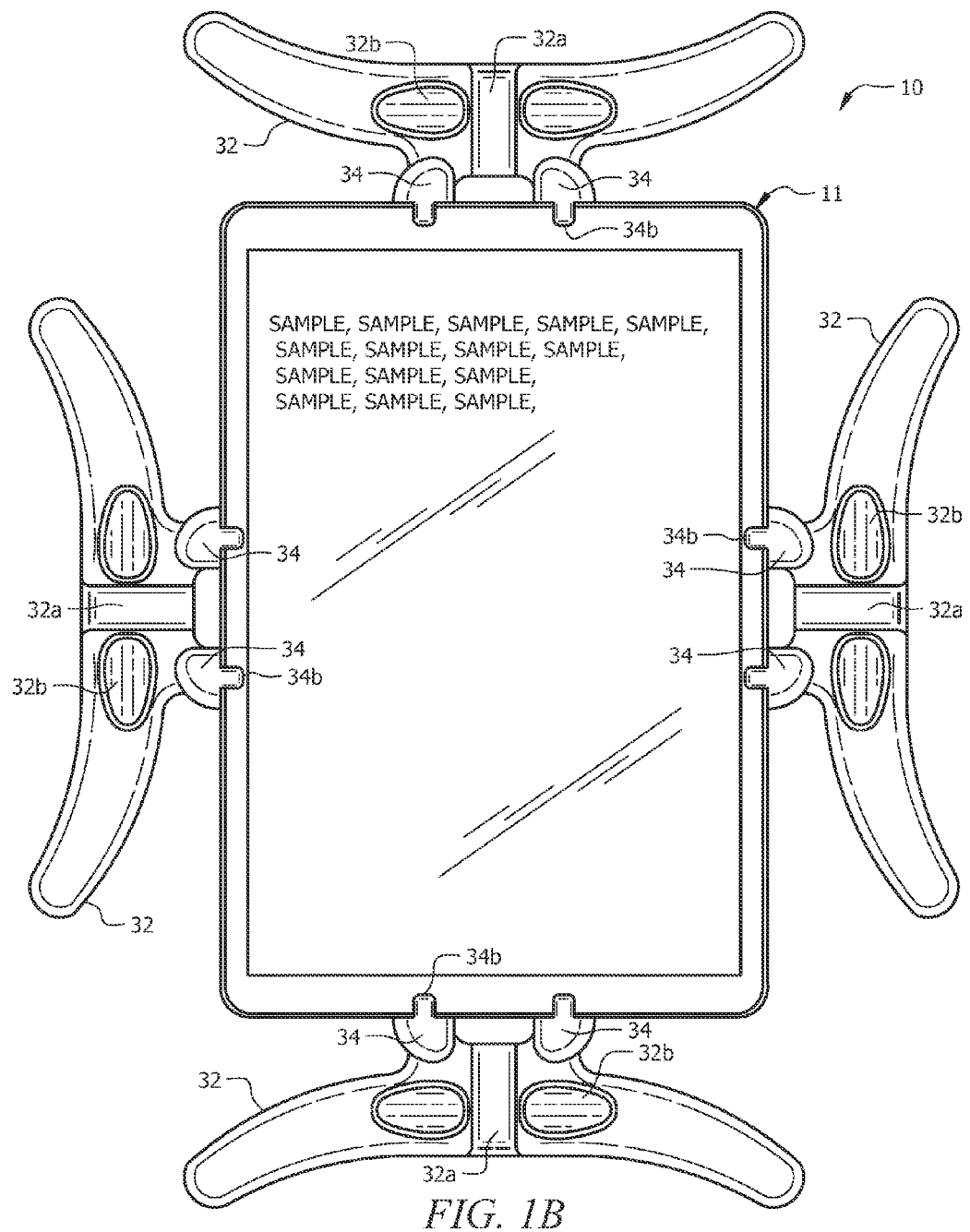
FIG. 1B is a bottom perspective view of said tablet holder holding a tablet in portrait orientation.

FIGS. 1A and 1B depict an illustrative embodiment of the novel structure which is denoted as a whole by the reference numeral 10. FIG. 1A depicts novel tablet holder when holding a mini IPAD® tablet 11 in landscape orientation and FIG. 1B depicts said tablet holder when holding said mini IPAD® tablet 11 in portrait orientation. Holder 10 also holds Kindle® and other brands of readers or tablets in landscape or portrait orientations. These two (2) figures depict a configuration where two (2) ergonomic handles 32 are formed integrally with holders 34 and where two (2) holders 34 are not provided with said ergonomic handles. All four (4) holders 34 may be provided with or without handles 32.

Handles 32 and holders 34 are disclosed in detail hereinafter and are engaged to a central base which is hidden from view by tablet 11 in FIGS. 1A and 1B.

Referring now to FIGS. 2A-2E, central base 12 of novel tablet holder 10 is preferably provided in the form of a thin, flat plate having upper surface or topside 12a, lower surface or underside 12b, and center 12c. Flange 14 is mounted about the periphery of base 12 in depending relation thereto. A leg 16 is mounted in each of the four (4) corners on underside 12b of base 12, each of said legs having a common length. Each leg has a length sufficient to provide clearance for all parts of device 10 that are formed on or connected to underside 12b of base 12 when tablet holder 10 is placed atop a support surface such as a tabletop. Diagonal strengthening ribs 18 are formed on underside 12b and interconnect legs 16 to inhibit warping of thin, flat plate 12.

In the preferred embodiment, the shape of base 12 is irregular. A square with rounded corners is modified by a protuberance 20 formed in each side of base 12, centered mid-length thereof. Each protuberance 20 also has rounded corners and extends radially outwardly relative to center 12c of base 12 and radially outwardly of each side of base 12.

Each protuberance 20 is recessed relative to upper surface 12a of base 12, creating channel 22 in base 12. The bottom wall of channel 22 is denoted 22a and the sidewalls of said channel are denoted 22b. All four (4) channels are in coplanar, open communication with square central region 24 of base 12.

A pair of guide rails, collectively denoted 28, is formed in each channel 22, each guide rail being raised with respect to channel bottom wall 22a, being spaced apart from detent 26, and from channel sidewalls 22b. Each guide rail 28 has a flat top surface.

As depicted in FIGS. 3A-3E, clamp 30, of which there are four (4), i.e., one for each channel 22 in a preferred embodiment, includes an ergonomically-shaped handle 32 that is formed integrally with slideably mounted holder 34. Holder 34 includes bottom plate 36 having slot 38 formed therein.

Each holder 34 further includes a pair of parallel guide rail housings 40 which are raised with respect to slotted bottom plate 36 on opposite sides of slot 38. Each guide rail housing has a flat top surface. An imaginary plane that is parallel to and spaced upwardly of channel bottom wall 22a is defined by said flat top surfaces.

The upstanding end wall of each holder 34 is denoted 34a.

Figure 4A:
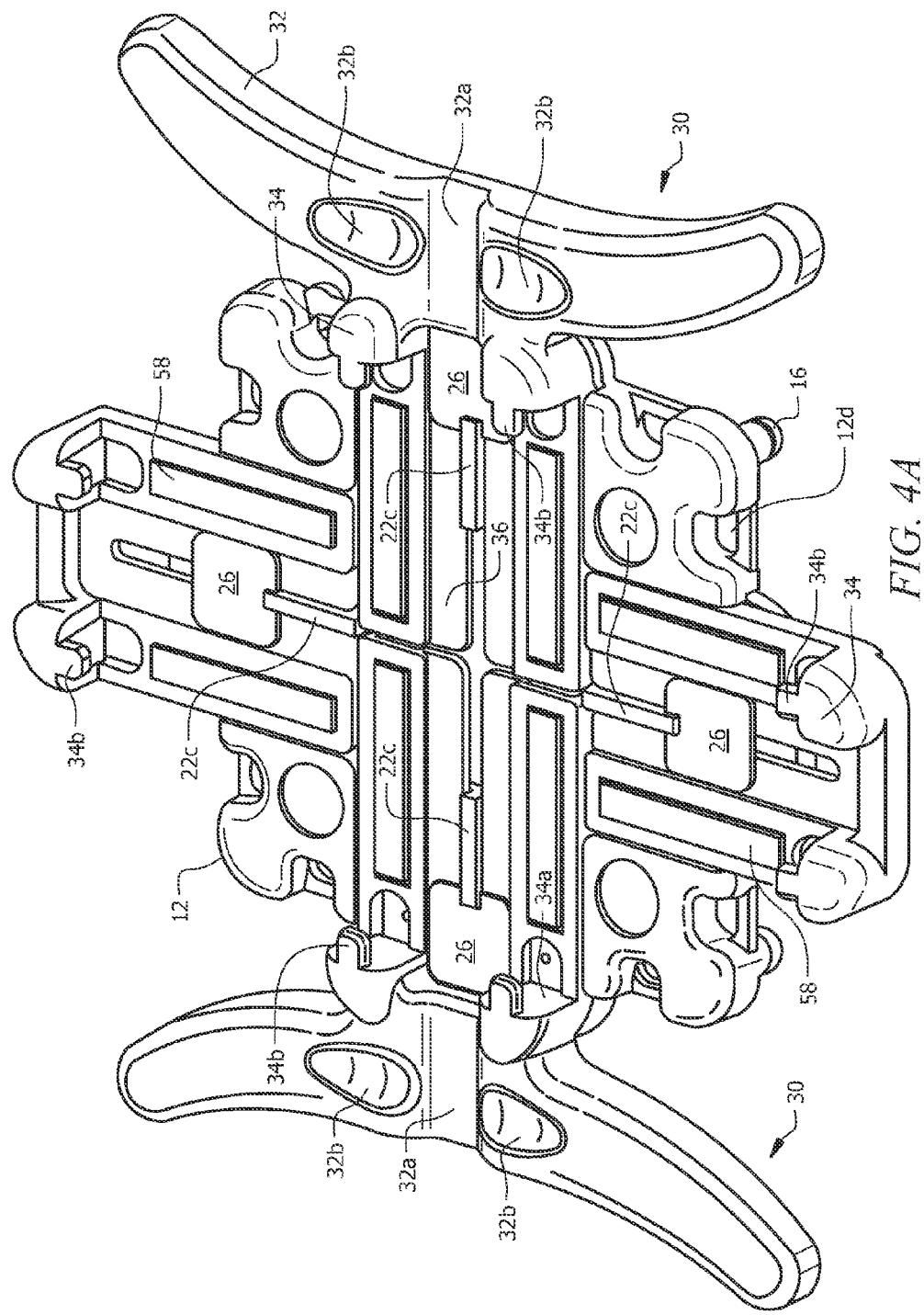
FIG. 4A is a top perspective view of the novel tablet holder.
Figure 4B:
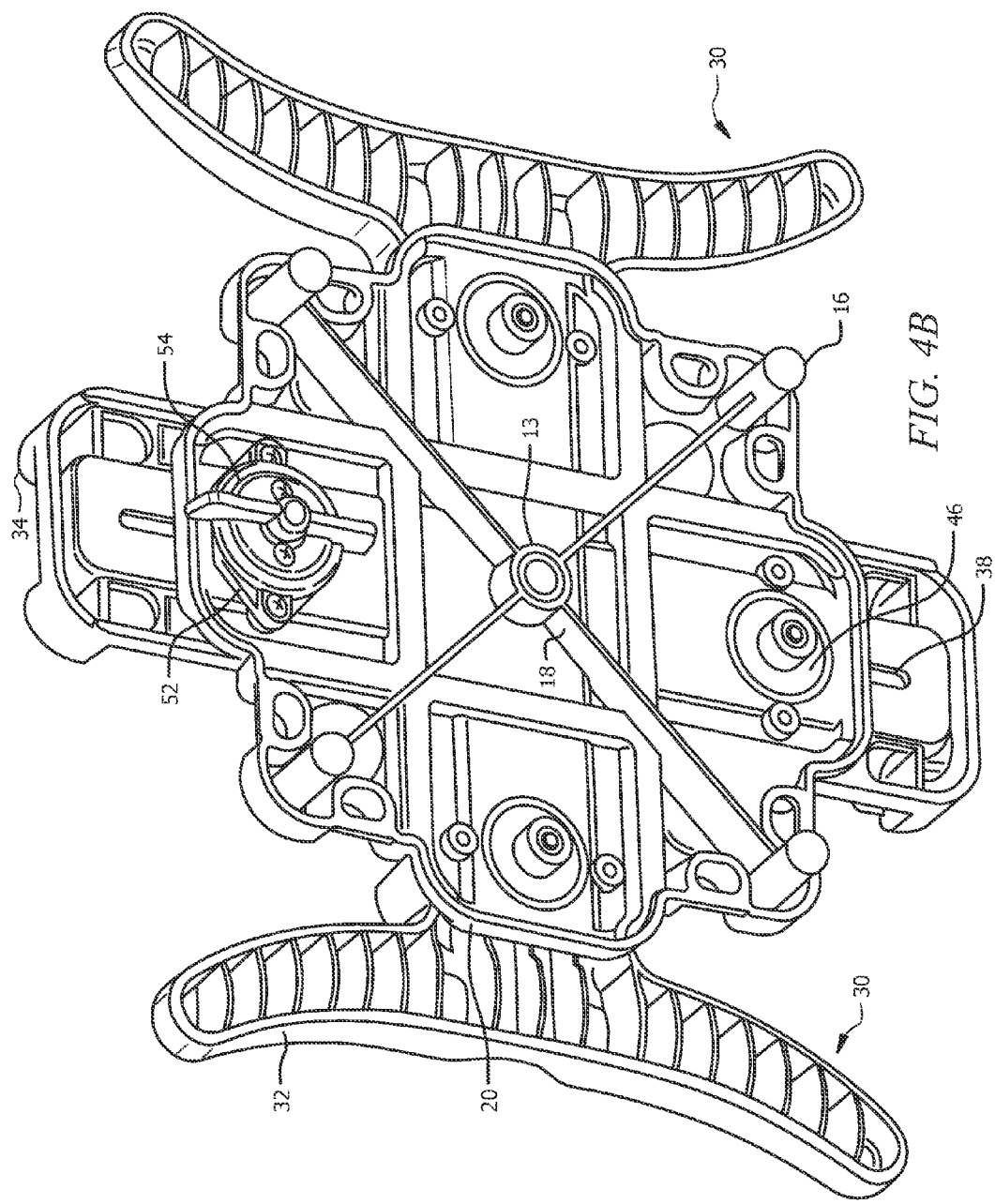
FIG. 4B is a bottom perspective view of said tablet holder.
Figure 4C:
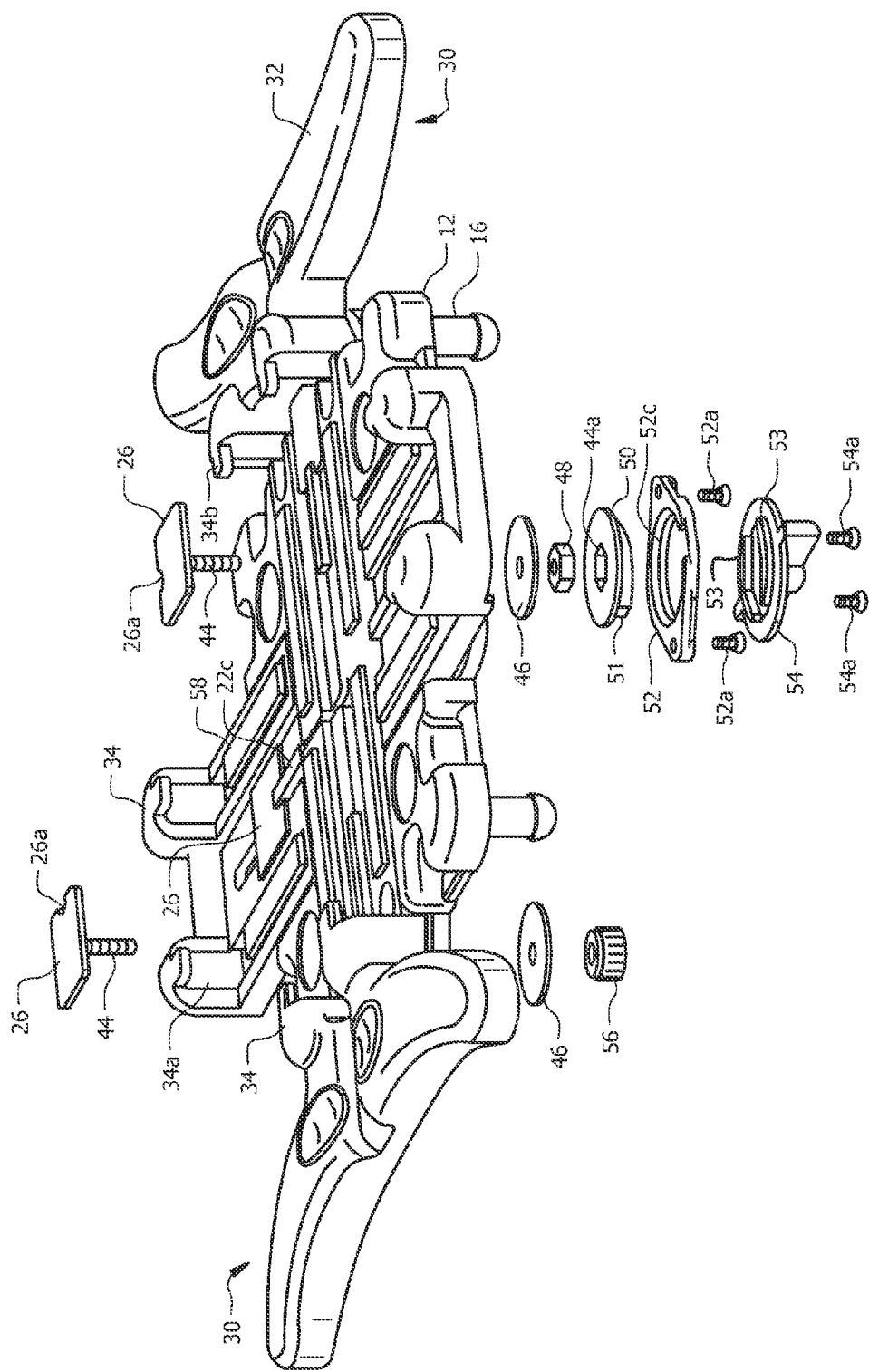
FIG. 4C is an exploded top perspective view of said tablet holder.
Figure 5A:
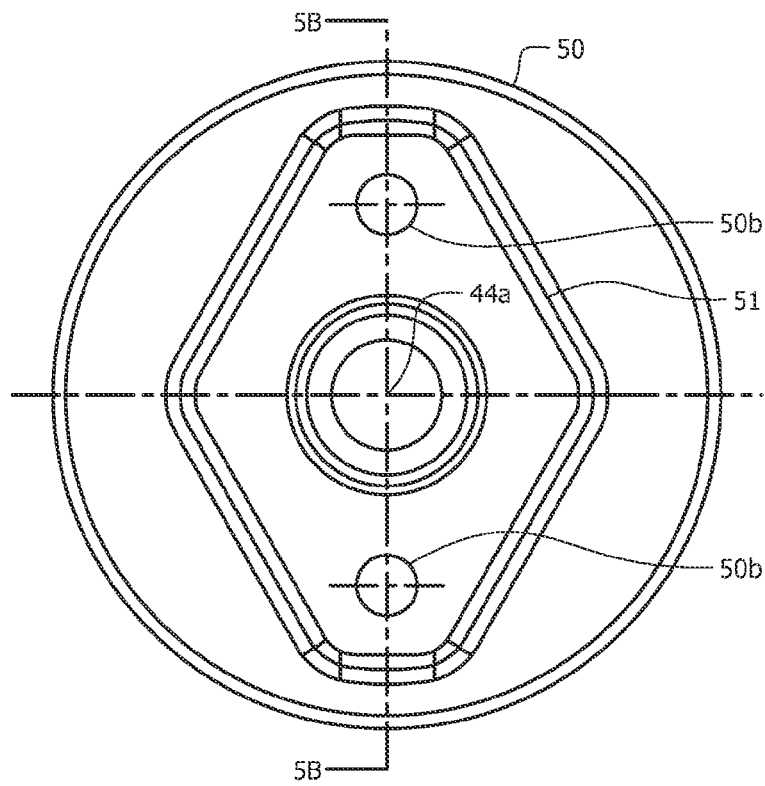
FIG. 5A is a bottom plan view of the novel knob bottom part.
Figure 5B:
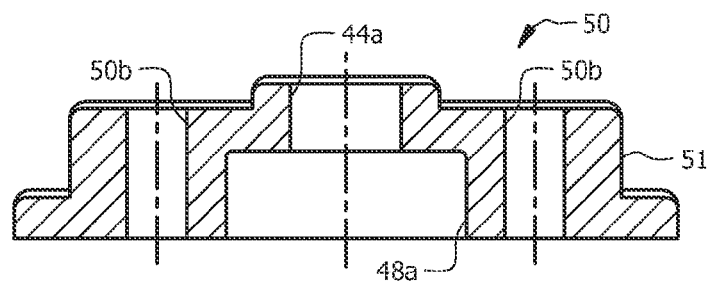
FIG. 5B is a sectional view taken along line 5B-5B in FIG. 5A.
Figure 5C:
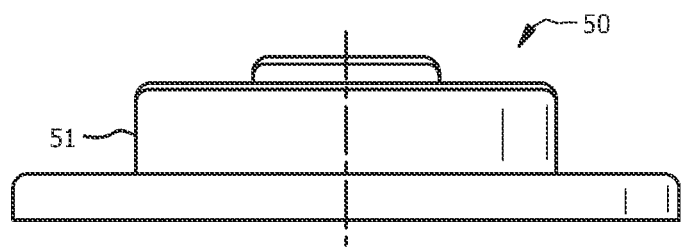
FIG. 5C is a side elevation view of said knob bottom part.
Figure 5D:
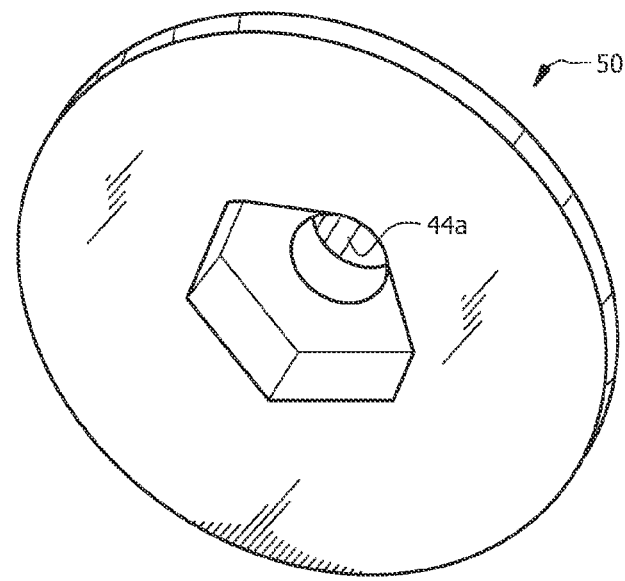
FIG. 5D is a perspective view of the top side of said knob bottom part.
Figure 6A:
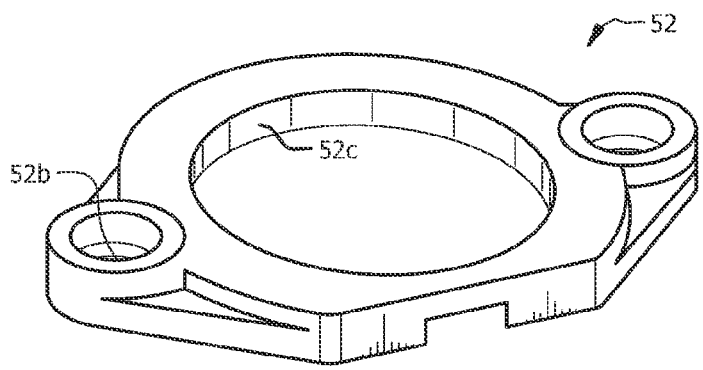
FIG. 6A is a top perspective view of the novel retainer ring.
Figure 6B:
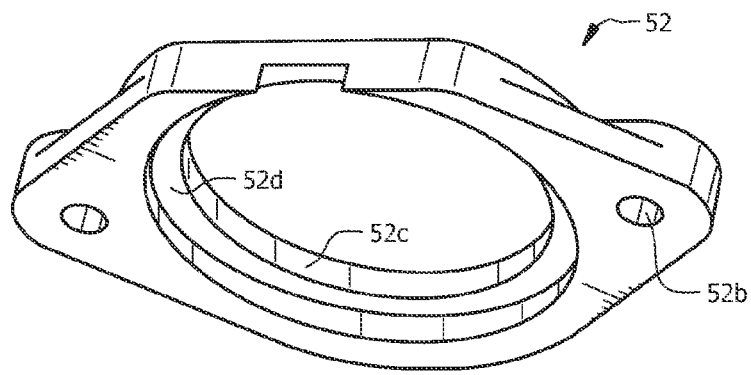
FIG. 6B is a bottom perspective view of said retainer ring.
Figure 6C:
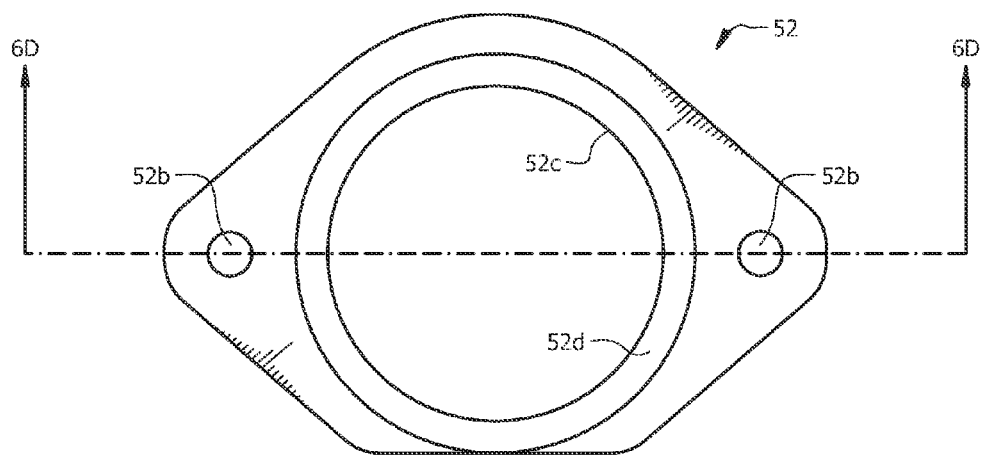
FIG. 6C is a top plan view of said retainer ring.
Figure 6D:
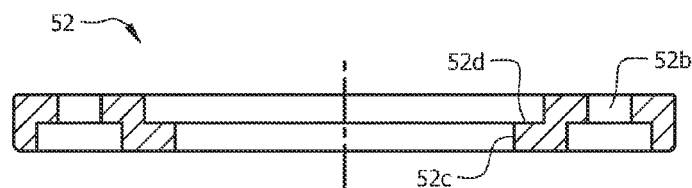
FIG. 6D is a sectional view taken along line 6D-6D in FIG. 6C.
Figure 6E:
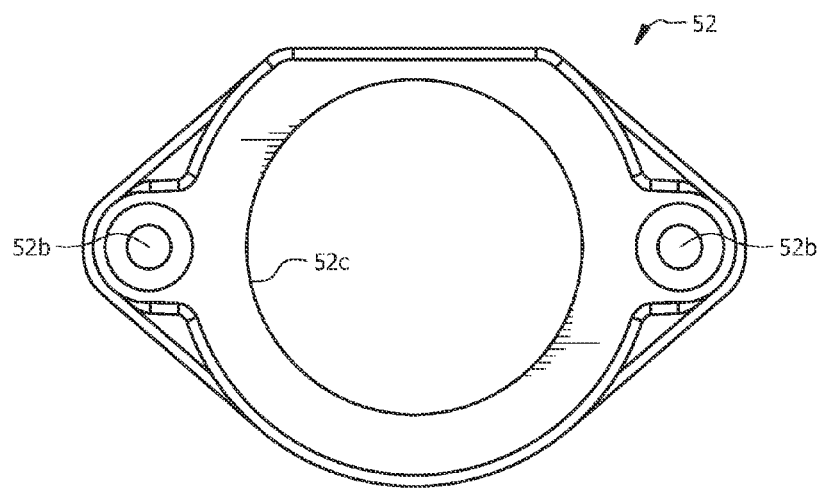
FIG. 6E is a bottom plan view of said retainer ring.
Figure 7A:
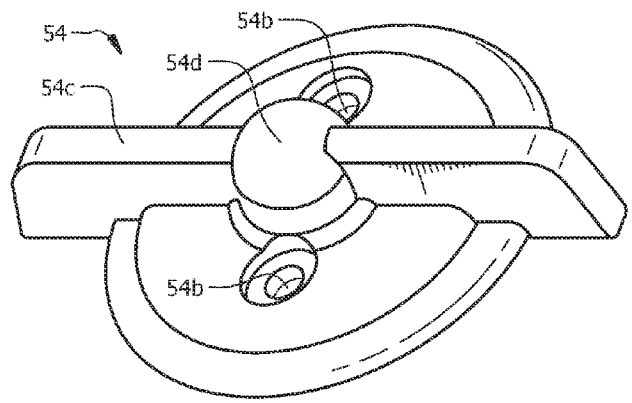
FIG. 7A is a top perspective view of the novel knob top part.
Figure 7B:
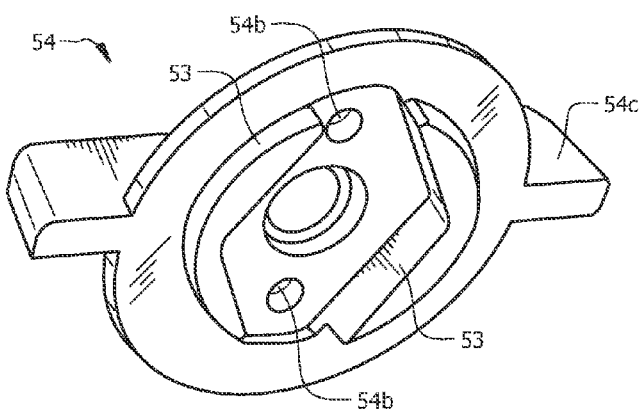
FIG. 7B is a bottom perspective view of the novel knob top part.
Figure 7C:
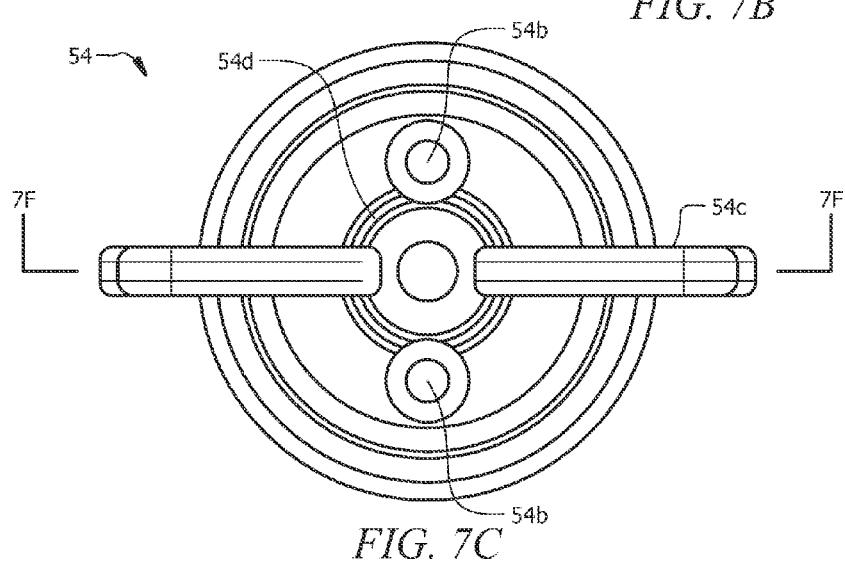
FIG. 7C is a top plan view of said knob top part.
Figure 7D:
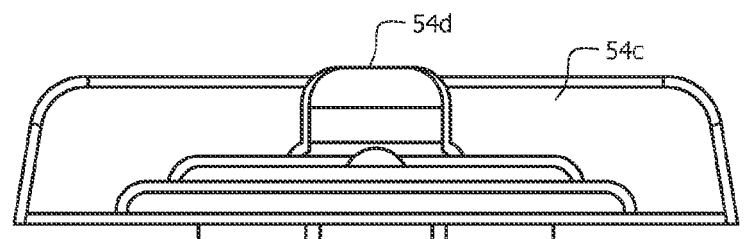
FIG. 7D is a side elevation view of said knob top part.
Figure 7E:
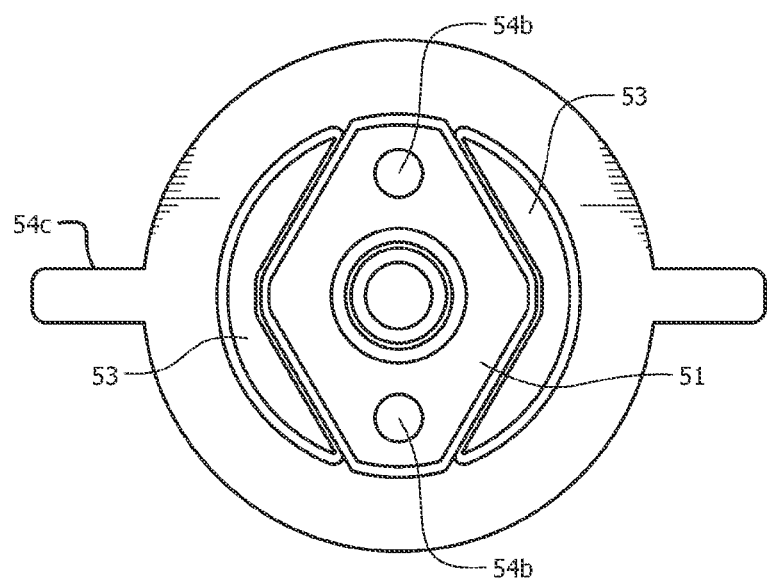
FIG. 7E is a bottom plan view of said knob top part.
Figure 7F:
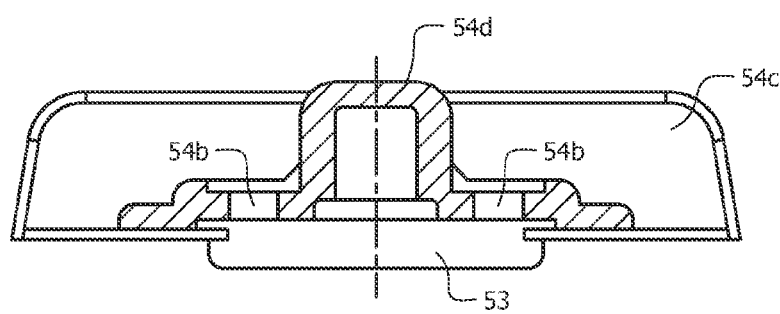
FIG. 7F is a sectional view taken along line 7F-7F in FIG. 7C.

Referring now to FIGS. 4A-4C, a thin, flat detent plate 26, depicted in FIGS. 4A and 4C, is mounted in each channel 22. Detent plate 26 has a range of travel extending from a first position where it overlies and abuts channel bottom wall 22a to a second position where it is parallel to said bottom wall and elevated with respect thereto. The raising and lowering of detent plate 26 with respect to channel bottom wall 22a is preferably controlled by screw 44 as disclosed hereinafter so that the number of functional positions of adjustment between said first and second positions is infinite. Screw 44 is formed integrally with or secured to detent plate 26 in depending relation thereto.

To slidingly interconnect each clamp 30 to base 12, detent plate 26 is raised above the imaginary plane defined by the flat top surfaces of guide rail housings 40. Slotted bottom plate 36 is then slid under said detent plate, slot 38 accommodating screw 44, and over the flat top surfaces of guide rail housings 40 so that said slotted bottom plate 36 is sandwiched between said flat top surfaces and the underside of said detent plate. Guide rails 28 are slidingly received within guide rail housings 40 of each holder 34 as said slotted bottom plate 36 is slid under said detent plate 26. Each clamp 30 is slid toward center 12c of base 12 until it abuts a sidewall of a tablet that overlies and is supported by said base 12.

When all four (4) pairs of upstanding end walls 34a of said four (4) holders abuttingly engage each side of the tablet, each holder 34 is then locked into said position in a manner disclosed hereinafter. A detent plate raising and lowering means, disclosed hereinafter, enables lowering of said detent plate 26, i.e., the space between said detent plate 26 and slotted bottom plate 36 is reduced, thereby clamping slotted bottom plate 36 to the flat top surfaces of guide rail housings 40.

Each holder 34 may be manipulated by a user without benefit of handle 32, i.e., each handle 32 is optional but is preferred because it facilitates the positioning of each holder 34.

Each detent plate 26 has a notch 26a formed therein, and each notch is engaged by a radially outermost end of its associated raised ridge 22c that is formed integrally with channel bottom wall 22a. The interconnection of each notch 26a with each ridge 22c prevents rotation of detent plate 26 and its screw 44 but does not prevent up and down movement of said detent plate and screw.

FIGS. 4A and 4B provide top and bottom perspective views of novel tablet holder 10 when configured to hold a tablet, not depicted in FIGS. 4A and 4B, in portrait configuration.

The preferred mechanism for raising and lowering detent plate 26 is depicted in FIG. 4C and is collectively referred to as the detent raising and lowering assembly 42. There are multiple ways to raise and lower detent 26 and all of such ways are within the scope of this invention.

In this particular embodiment, externally threaded screw 44 depends from detent 28 in perpendicular relation thereto. The head of screw 44 is non-tool-engageable and is flush with the top surface of detent plate 26. Accordingly, because raised ridge 22c prevents rotation of detent plate 26, rotation of a nut that engages said screw 44 results in raising or lowering of said detent plate, dependent upon the direction of nut rotation. For a standard right-handed screw thread, advancement of a nut lowers detent 26, locking holder 34 into place as aforesaid. Retraction of said nut raises said detent, enabling sliding adjustment of holder 34 inwardly or outwardly relative to center 12c of base 12.

In this embodiment, washer 46 underlies and abuts channel bottom wall 22a and the central opening of washer 26 is in axial alignment with screw 44. Nut 48 underlies washer 46 and engages screw 44.

Referring now to FIGS. 5A-5D, nut 48 is captured within non-round recess 48a formed in knob bottom part 50, i.e., hex-shaped recess 48a formed in the top side of knob bottom part 50 captures hex nut 48 and thus said nut rotates conjointly with knob bottom part 50. Screw 44 extends through opening 44a to engage nut 48.

The structure of knob bottom part 50 includes a generally diamond-shaped, i.e., non-round, raised part 51. Said raised part 51 depends from the bottom of knob bottom part 50.

The structure of retaining ring 52 is best depicted in FIGS. 6A-6E. Apertures 52b, 52b receive screws 52a, 52a (FIG.

4C). Retaining ring 52 is secured by screws 52a, 52a to the underside of channel bottom wall 22a, thereby retaining knob bottom part 50 in engaged relation to nut 48. The central opening of retaining ring 52 is denoted 52c. Ledge 52d which encircles opening 52c supports knob bottom part 50.

The structure of knob top part 54 is best depicted in FIGS. 7A-7F. Knob top part 54 underlies retainer ring 52 and is engaged to the underside of knob bottom part 50 by screws 54a, 54a (FIG. 4C) which are received within openings 54b, 54b. Diamond-shaped part 51 of knob bottom part 50 is nested within a complementary-shaped recess which is defined by a pair of mirror-image walls, collectively denoted 53 in FIGS. 7B and 7D-F. Walls 53, 53 are also depicted in FIG. 4C which best depicts how said walls 53 extend through central opening 52c formed in retaining ring 52 to engage said diamond-shaped raised part 51 which depends from knob bottom part 50.

Rotation of knob top part 54 causes conjoint rotation of knob bottom part 50 and hence of nut 48 that rotates conjointly with said knob bottom part. Rotation of nut 48 causes up or down travel of screw 44 and detent plate 26, depending upon the direction of rotation of knob top part 54 because screw 44 and detent plate 26 cannot rotate due to raised ridge 22c as aforesaid.

Knob top 54 includes a diametrically disposed upstanding wall 54c that performs the same function of the wings of a wing nut, i.e., wall 54c is gripped by a user to manually rotate said knob top part 54. Raised hub 54d is formed in the center of knob top 54 and is a structural part of wall 54c.

FIG. 4C also depicts an alternative way of causing raising and lowering of detent plate 26. Washer 46 is used as in the first embodiment, but nut 48, knob bottom 50, retainer ring 52 and its screws, and knob top part 54 and its screws are replaced by thumb nut 56. Said thumb nut 56 has a knurled surface and a diameter sufficiently large enough to enable a user to manually rotate it in either direction as required to raise and lower detent plate 26.

The common extent of legs 16 exceeds the combined vertical extent of detent raising and lowering assembly 42 so that said detent raising and lowering assembly is spaced above a table top when device 10 is supported by said tabletop.

Figure 2A:
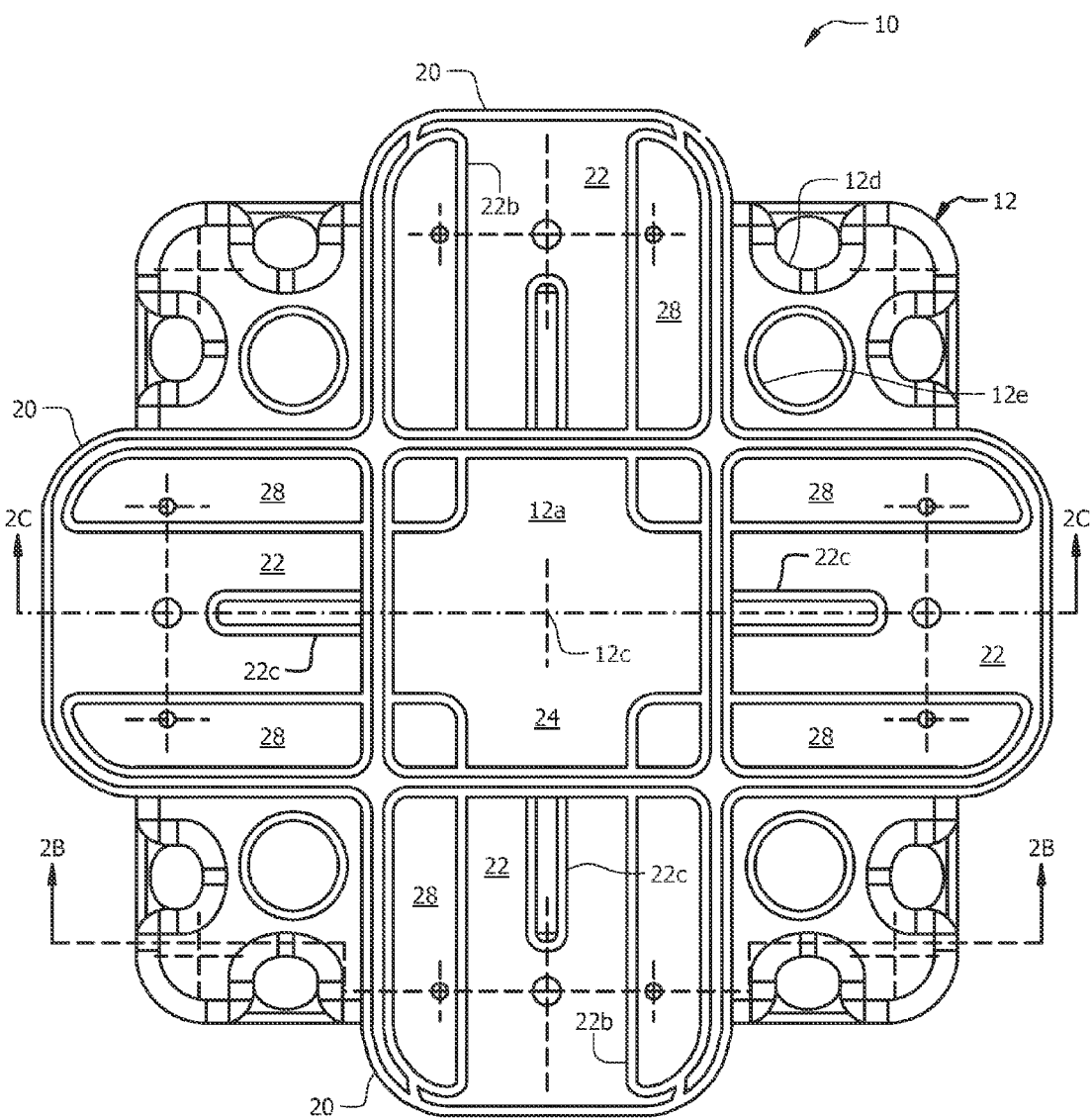
FIG. 2A is a top plan view of the novel base.
Figure 2B:
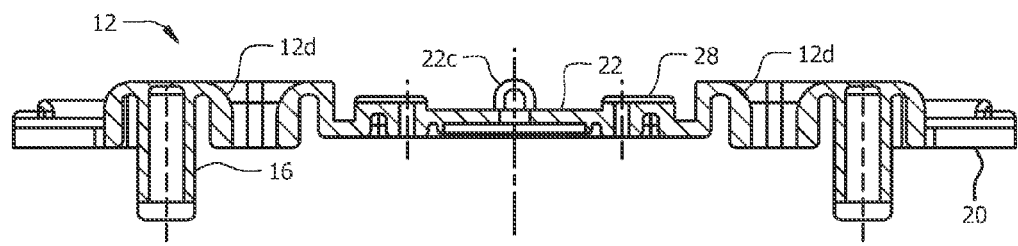
FIG. 2B is a sectional view taken along line 2B-2B in FIG. 1A.
Figure 2C:
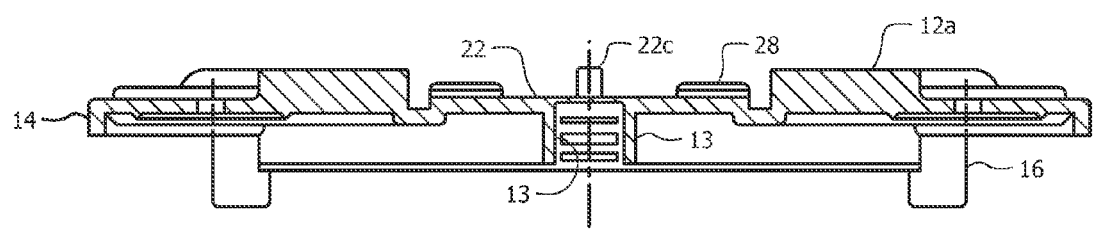
FIG. 2C is a sectional view taken along line 2C-2C in FIG. 1A.
Figure 2D:
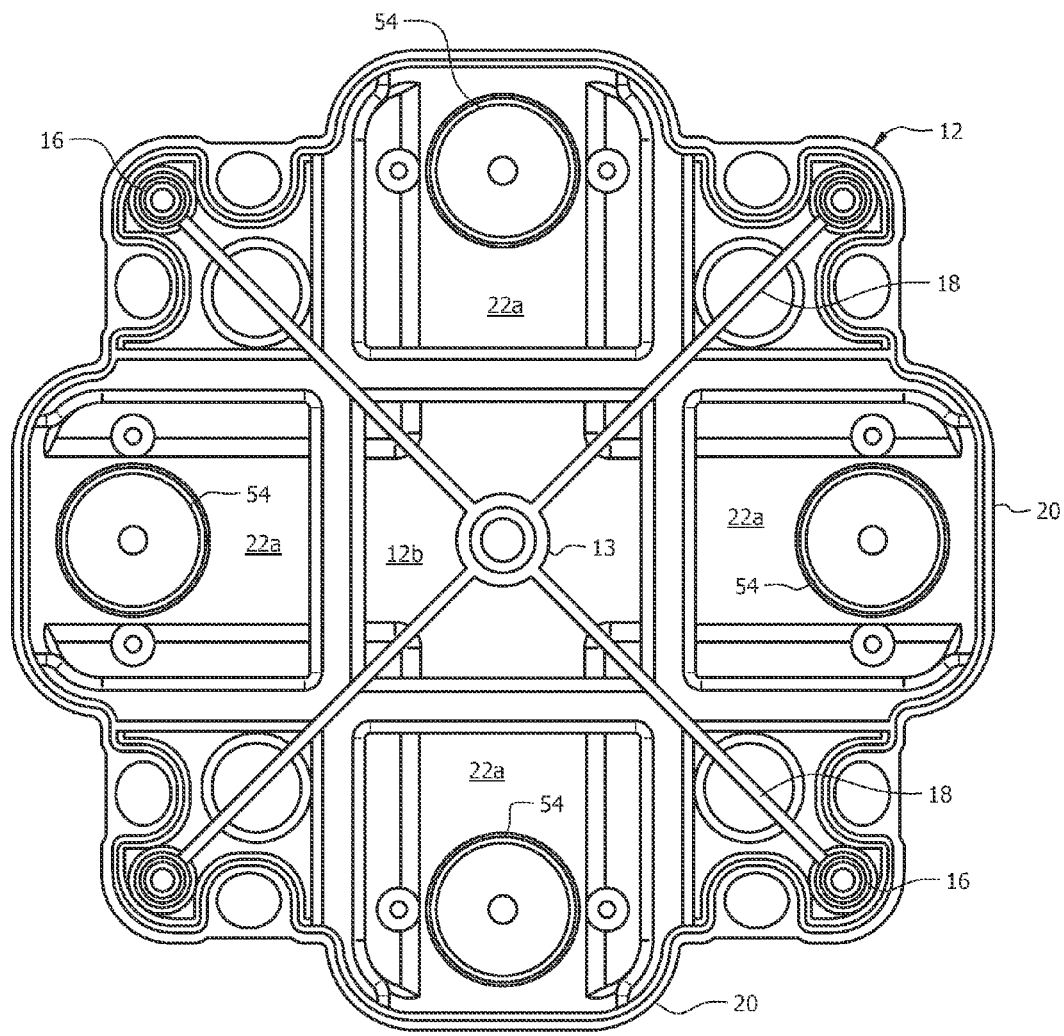
FIG. 2D is a bottom plan view of the novel base.
Figure 2E:
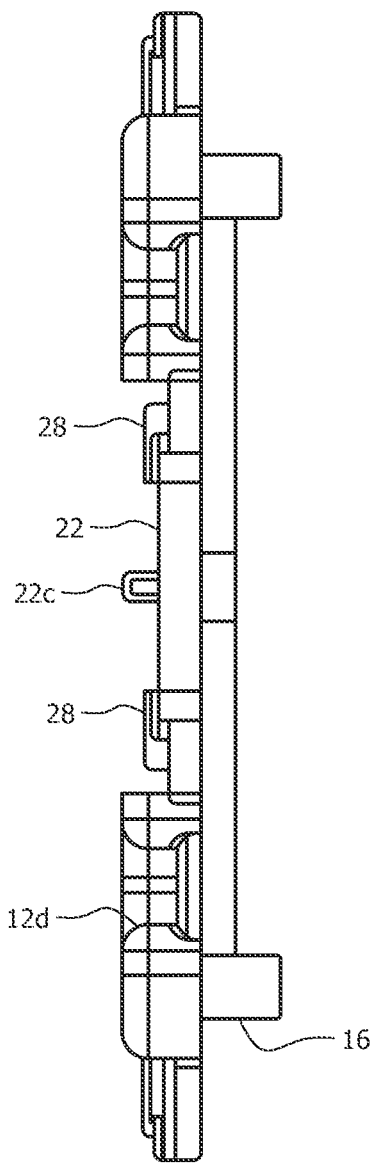
FIG. 2E is an edge view of said base.
Figure 3A:
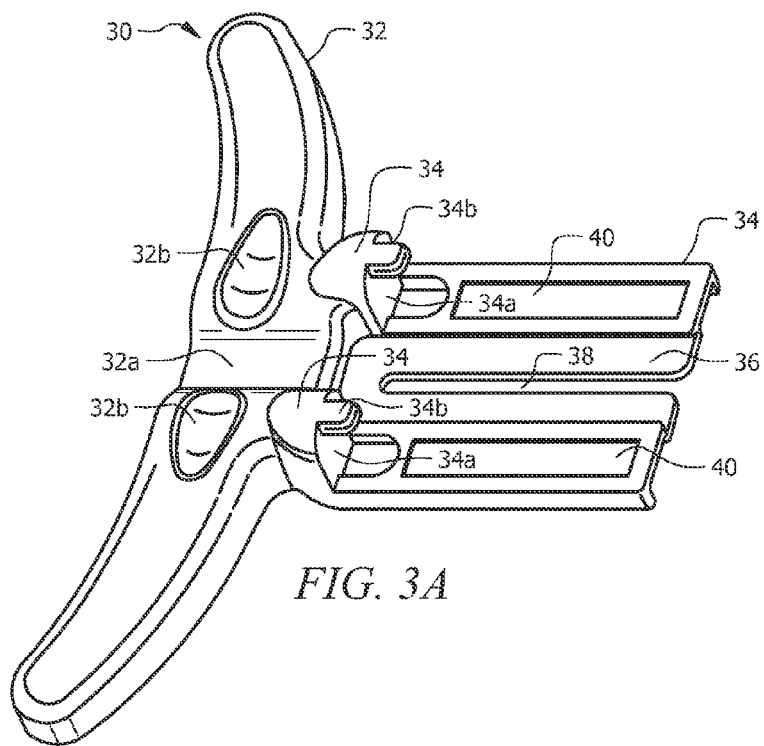
FIG. 3A is a top perspective view of the novel handle.
Figure 3B:
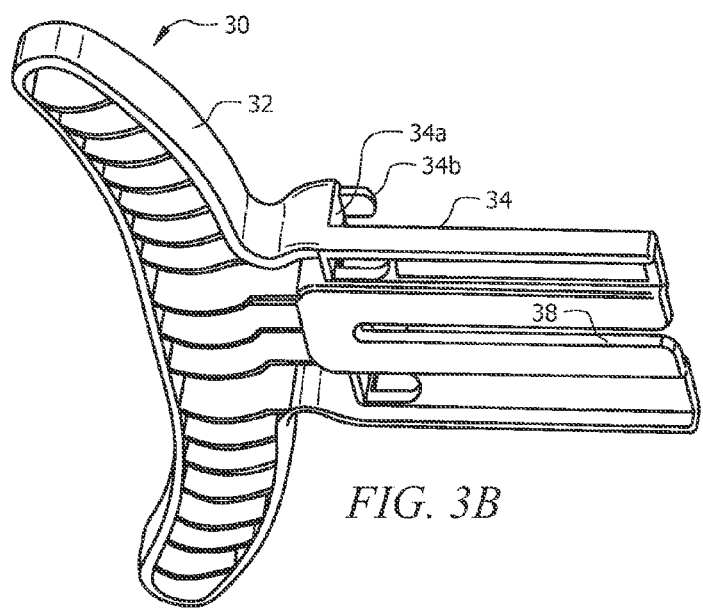
FIG. 3B is a bottom perspective view of the novel handle.
Figure 3C:
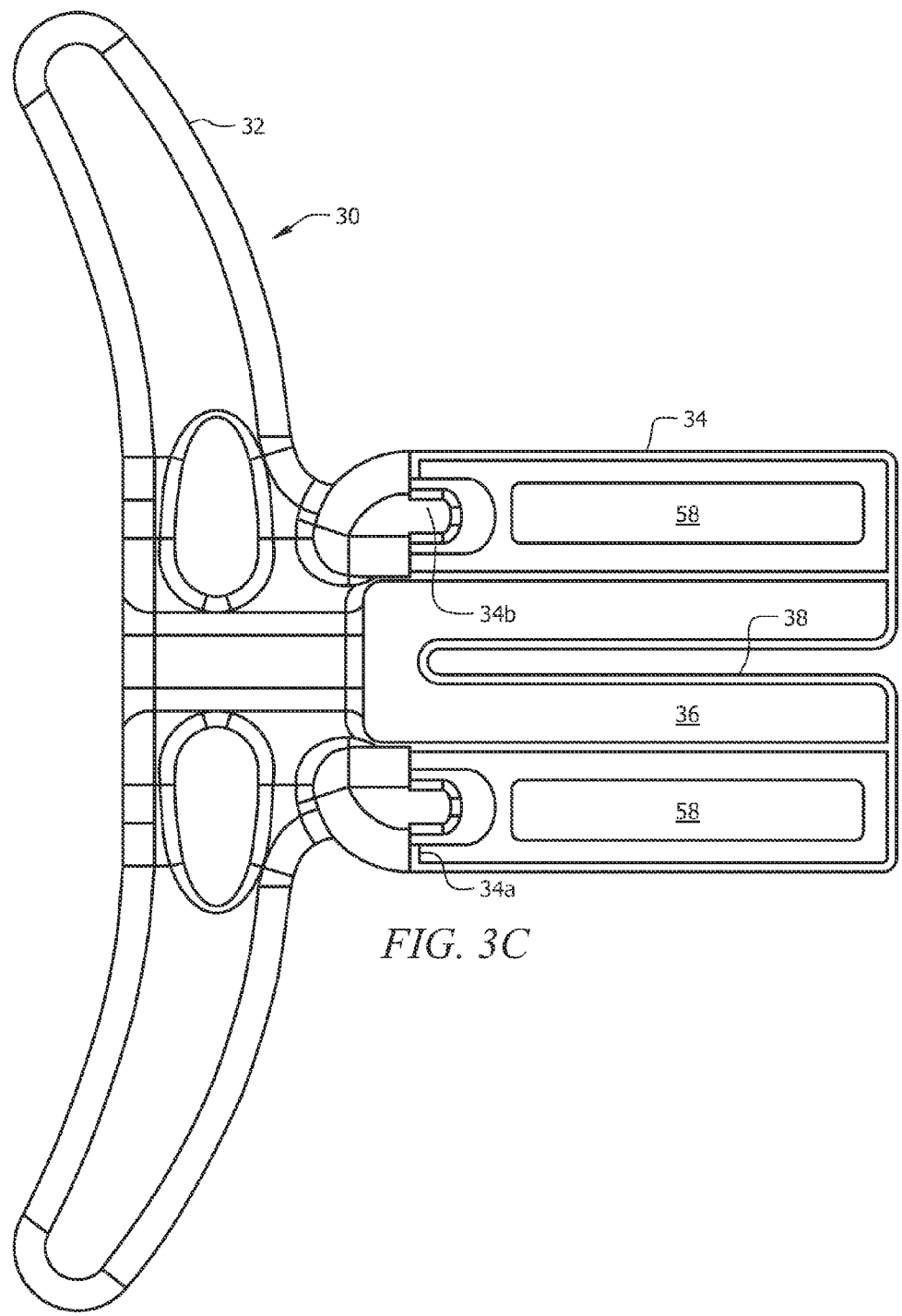
FIG. 3C is a top plan view of the novel handle.

As depicted in FIG. 2A, at least one opening 12d may be formed in base 12 to enable attachment of a lanyard line to base 12 so that tablet holder 10 can be mounted about a user's neck or shoulder or any suitable stand. Further openings 12e can be provided to save materials and to lighten base 12.

As best depicted in FIG. 4A, each handle 32 has a central channel 32a formed in it to accommodate a power cord. Dished regions 32b formed on opposite sides of said channel facilitate handling of the clamp. Moreover, an overhang 34b may be added to each upstanding tablet-engaging end wall 34a of each holder 34. Each overhang 34b further captures the tablet if device 10 is inverted.

As depicted in FIGS. 4A and 4C, foam pads 58 are positioned within mating recesses formed in holders 34 if an ultrathin tablet is to be held. The foam does not scratch the tablet but occupies the excess space that would be occupied by tablets of conventional thickness and provides a bias that urges the thin tablet against overhangs 34a.

As best depicted in FIG. 4B, an internally threaded sleeve or insert 13 may be centered at center 12c of base 12, on the underside thereof. Sleeve 13 receives a conventional screw of the type associated with camera and camcorder tripods, both full size and table top size. Said screws, not depicted, are identified as ¼ 20 screws, meaning that the diameter of the screw is a quarter of an inch and that there are twenty (20) threads per linear inch.

It will thus be seen that the objects set forth above, and those made apparent from the foregoing disclosure, are efficiently attained and since certain changes may be made in the above construction without departing from the scope of the invention, it is intended that all matters contained in the foregoing disclosure or shown in the accompanying drawings shall be interpreted as illustrative and not in a limiting sense.

It is also to be understood that the following claims are intended to cover all of the generic and specific features of the invention herein disclosed, and all statements of the scope of the invention that, as a matter of language, might be said to fall therebetween.

What is claimed is:

1. A tablet holder, comprising:
   a central base having a generally square configuration with four sides;
   four channels formed in said central base, each channel being in open communication with one of said four sides, each channel having an axis of symmetry normal to an axis of symmetry of its contiguous channels, and each axis of symmetry radiating outwardly from a center of said central base and bisecting its associated side;
   a holder slideably mounted within each of said channels, there being one holder slideably mounted within each channel, each holder having a radially innermost position and a radially outermost position;
   each holder having an upstanding, tablet-engaging end wall formed in a radially outermost end of said holder; and
   each upstanding, tablet engaging end wall adapted to abuttingly engage a side wall of a tablet that overlies and is supported by said central base when each holder is slid in its associated channel toward said center of said central base;
   said central base being in the form of a thin, flat, generally square plate;
   said generally square plate having a protuberance formed in each side of said central base, each protuberance extending radially outwardly relative to a center of said central base and projecting radially outwardly of each side of said central base;
   each protuberance being recessed relative to a top surface of said central base, thereby creating said channels, each channel having a flat channel bottom wall and upstanding sidewalls;
   each holder including a slotted bottom plate having a slot formed therein, each slot extending radially outwardly relative to said center of said central base;
   a thin, flat detent plate mounted in each channel, midway between said upstanding sidewalls;
   a pair of guide rails formed integrally with said flat channel bottom wall, each guide rail of said pair of guide rails having a flat top surface and being raised with respect to said flat channel bottom wall, each guide rail of said pair of guide rails being spaced apart from said detent plate, and from said upstanding sidewalls;
   each holder further including a pair of parallel guide rail housings which are raised with respect to said flat channel bottom wall on opposite sides of said slot and which slideably receive said guide rails of said pair of guide rails;
   said guide rail housings having flat top surfaces that respectively overlie the flat top surfaces of said guide rails when said guide rails are slideably received within said guide rail housings;
   each detent plate having a range of travel extending from a first position where it overlies and abuts an associated flat channel bottom wall to a second position where it is parallel to said flat channel bottom wall and elevated with respect thereto;

each detent plate being raised above an imaginary plane defined by said flat top surfaces of said guide rail housings to enable sliding of each slotted bottom plate under each detent plate and over said flat top surfaces of said guide rails so that each slotted bottom plate is sandwiched between said flat top surfaces of associated guide rail housings and the underside of an associated detent plate; and a locking means adapted to secure each holder against sliding movement when all four holders are adapted to abuttingly engage each side of said tablet.

2. The tablet holder of claim 1, further comprising:

a raising and lowering means for raising and lowering said detent plate with respect to said flat channel bottom wall;

each holder being locked against sliding by clamping said slotted bottom plate to the flat top surfaces of said guide rail housings, said clamping accomplished by lowering said detent plate with respect to said slotted bottom plate.

3. The tablet holder of claim 2, further comprising:

said raising and lowering means including an externally threaded screw that is integrally formed with and which depends from said detent plate in perpendicular relation thereto;

said raising and lowering means further including means for preventing rotation of said detent plate and hence of said screw;

a nut that rotatably engages said screw;

means for causing rotation of said nut in a first direction or a second direction opposite to said first direction while holding said nut against linear travel so that said screw and hence said detent plate are constrained to displace away from said channel bottom wall or to displace toward said channel bottom wall, depending upon the direction of rotation of said nut.

4. The tablet holder of claim 3, further comprising:

said raising and lowering means further including a washer that underlies and abuts said channel bottom wall, said washer having a central opening in axial alignment with said screw and said nut underlying said washer and engaging said screw; and a rotatably mounted knob bottom part having a non-round recess that captures said nut and causes said nut to rotate conjointly with said knob bottom part.

5. The tablet holder of claim 4, further comprising:

a retainer ring having a round recess formed therein for accommodating said knob bottom part;

said retainer ring non-rotatably secured to an underside of said flat channel bottom wall, thereby retaining said knob bottom part in engaged relation to said nut.

6. The tablet holder of claim 5, further comprising:

a knob top part disposed in underlying relation to said retainer ring;

said knob top part engaged to said knob bottom part so that rotation of said knob top part causes conjoint rotation of said knob bottom part and hence of said nut that rotates conjointly with said knob bottom part, thereby causing up or down travel of said externally threaded screw and said detent plate, depending upon the direction of rotation of said knob top part, because said externally threaded screw and said detent plate cannot rotate due to said raised ridge.

7. The tablet holder of claim 6, further comprising:

a diametrically disposed upstanding wall formed in said knob top part, said upstanding wall facilitating manual rotation of said knob top part.

8. The tablet holder of claim 3, further comprising:

said raising and lowering means for raising and lowering said detent plate including a washer that underlies and abuts said channel bottom wall, said washer having a central opening in axial alignment with said externally threaded screw, and said nut underlying said washer and engaging said externally threaded screw; and a thumb nut having a diameter sufficiently large to enable a user to manually rotate it in either direction as required to raise and lower said detent plate.

9. The tablet holder of claim 3, further comprising:

said means for preventing rotation of said detent plate including a notch formed in said detent plate; and a raised ridge formed integrally with said channel bottom wall;

said raised ridge engaging said notch so that said detent plate and said screw formed integrally therewith cannot rotate about an axis of rotation of said screw and so that said detent plate and said screw are free to displace toward and away from said channel bottom wall.

10. The tablet holder of claim 2, further comprising:

a plurality of legs secured to an underside of said central base;

said legs having a common extent that exceeds the combined extent of said detent plate raising and lowering means so that said detent plate raising and lowering means is spaced above a table top when said tablet holder is supported by said table top.

11. The tablet holder of claim 1, further comprising:

a handle formed integrally with each of said holders to facilitate manual sliding of said holders.

12. The tablet holder of claim 11, further comprising:

a channel formed in each handle to accommodate a power cord.

13. The tablet holder of claim 12, further comprising:

a dished region formed in each handle on opposite sides of said channel to facilitate grasping of said handle.

14. The tablet holder of claim 1, further comprising:

an overhang formed in each upstanding, tablet-engaging end wall of each holder to capture a tablet if said tablet holder is inverted.

15. The tablet holder of claim 1, further comprising:

at least one opening formed in said central base to enable attachment of a lanyard line to said central base.

16. The tablet holder of claim 1, further comprising:

at least one material-saving opening formed in said central base.

17. The tablet holder of claim 1, further comprising:

at least one foam pad positioned atop each bottom plate of said holders.

18. The tablet holder of claim 1, further comprising:

an internally threaded sleeve positioned in the center of said central base on an underside thereof;

said internally threaded sleeve adapted to receive a screw for engaging a tripod so that said tablet holder may be supported by a tripod.

* * * * *